Figure 9:
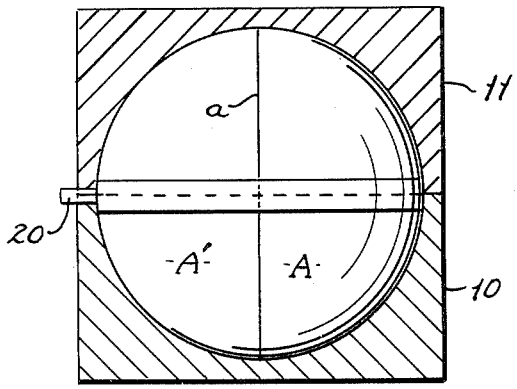

May 30, 1950
F. T. ROBERTS
2,509,882
METHOD AND APPARATUS FOR VULCANIZING HOLLOW RUBBER ARTICLES
Filed Aug. 21, 1946
3 Sheets-Sheet 1
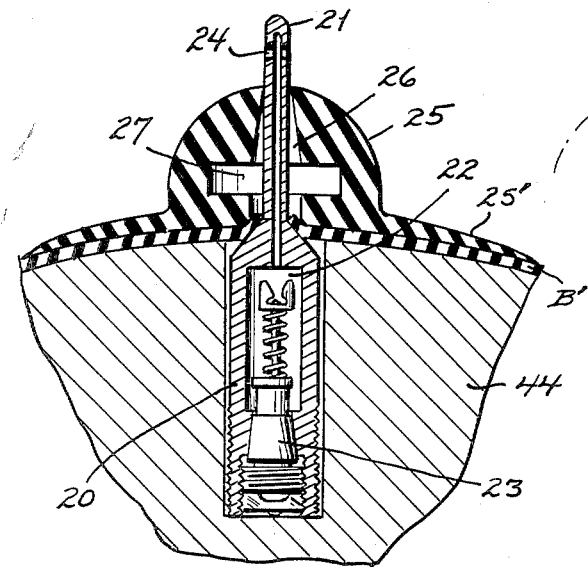
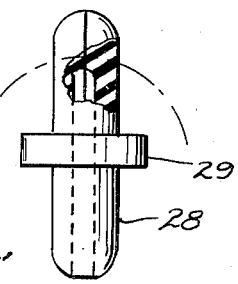
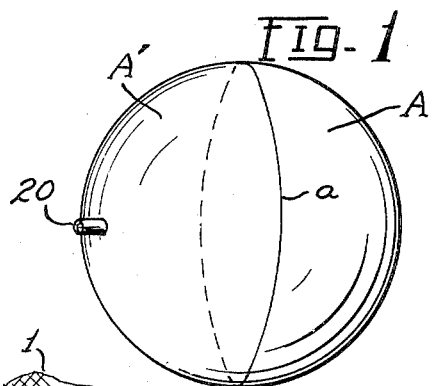
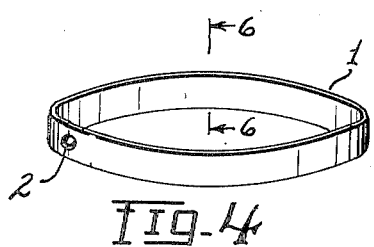
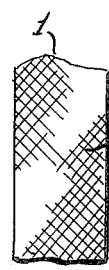
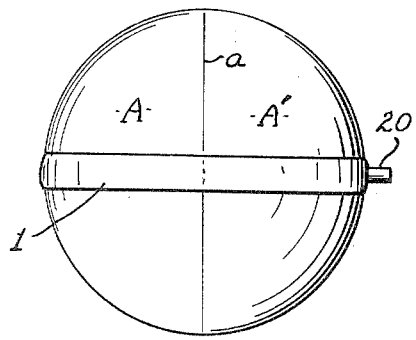
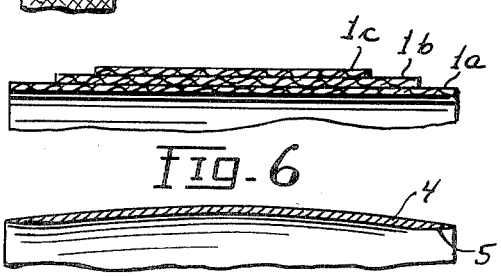
INVENTOR.
Fred T. Roberts
BY Bates, Teare & McBean
Attorneys INVENTOR.
Fred T. Roberts
BY
Bates, Teare & McBean
Attorneys.

May 30, 1950  
F. T. ROBERTS  
2,509,882  
METHOD AND APPARATUS FOR VULCANIZING HOLLOW RUBBER ARTICLES  
Filed Aug. 21, 1946  
3 Sheets-Sheet 3

INVENTOR.  
Fred T. Roberts  
BY Bates, Teare & McBean  
Attorneys

Patented May 30, 1950

2,509,882

UNITED STATES PATENT OFFICE 2,509,882

METHOD AND APPARATUS FOR VULCANIZING HOLLOW RUBBER ARTICLES

Fred Thomas Roberts, Ridgefield, Conn.

Application August 21, 1946, Serial No. 692,041

15 Claims. (Cl. 18—35)

This invention relates to a method and apparatus for vulcanizing hollow rubber articles particularly such thin-walled bladders as are used in footballs, basket balls, and other athletic balls.

Heretofore such thin-walled bladders have been pieced together by hand from panels cut from calendered rubber, lapping or scarfing the meeting edges of the panels, with the seams then reinforced by strips of rubber. It has been impossible by such method to make a bladder of uniform thickness of wall.

A more serious disadvantage in the balls or bladders made by the usual method is that when the article is vulcanized in a two-part mold, as is customary, there is great danger that the thin wall will blow out between the meeting edges of the mold members, caused by the internal pressure which is usually supplied by compressed air through a valve affixed to the bladder, as the mold members which seldom make actual tight contact with each other. In vulcanizing such a ball in a two-part mold it has accordingly frequently resulted that an external equatorial fin is formed on the ball with a corresponding equatorial groove on the interior at the meeting faces. Such groove definitely weakens the ball in this region, so that a troublesomely large percentage of such thin-walled balls becomes defective from this cause.

It is an object of my invention to make a bladder of uniform thickness throughout and to prevent the bladder blowing out or forming a weakened zone at the meeting faces of the vulcanizing mold. I accomplish this by providing a band which surrounds the bladder within the vulcanizing mold extending across the meeting faces of the mold members and preventing any crack, with the result that the vulcanized bladder does not become thinned or weakened in such region.

Another object of the invention is to provide for the protection of the seams of the raw rubber bladder when it is inflated preliminary to the insertion in the mold for curing, and to effect this I provide a harness having not only a band to extend across the meeting faces of the vulcanizing mold but having one or more other bands extending about the bladder in position to overlie its seams, this harness being left in the mold during vulcanization and thereafter removed.

Another object of the invention is to provide strengthening means for the thin-walled bladder avoiding the necessity of putting strips of rubber overlapped or scarfed seams. This is accomplished by the same harness over all of the seams, which prevents separation thereof and results in a concentrated pressure at the seam during vulcanization, causing the lapped portions of the seams to form internal reinforces. This is of especial value where the bladder is made of several sections joined by meridional seams, though in my preferred method I avoid such seams by making a bladder of two half sections joined by a single equatorial seam, as hereinafter explained.

My invention is illustrated in the accompanying drawings, showing a preferred apparatus carrying out the method, and is hereinafter fully explained.

Figure 10:
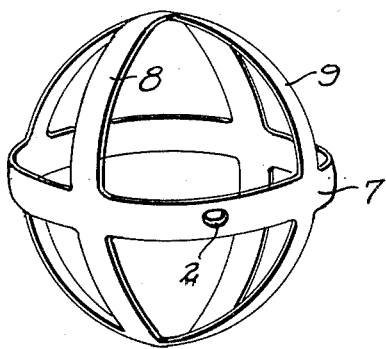
Figure 12:
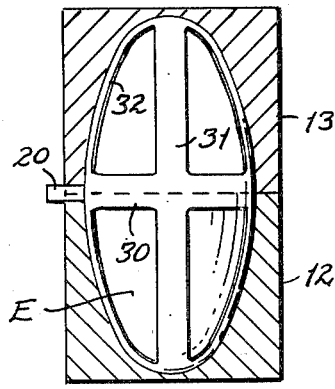
Figure 11:
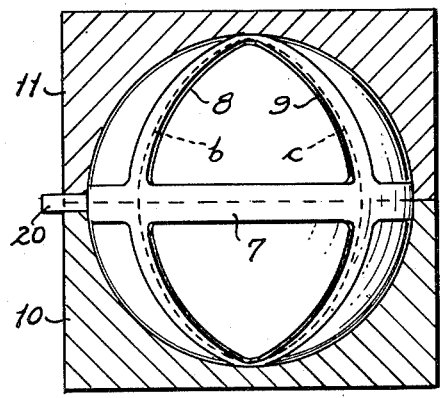
Figure 13:
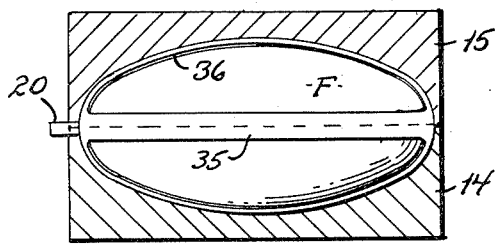
Figure 14:
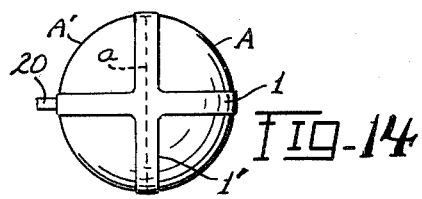
Figure 15:
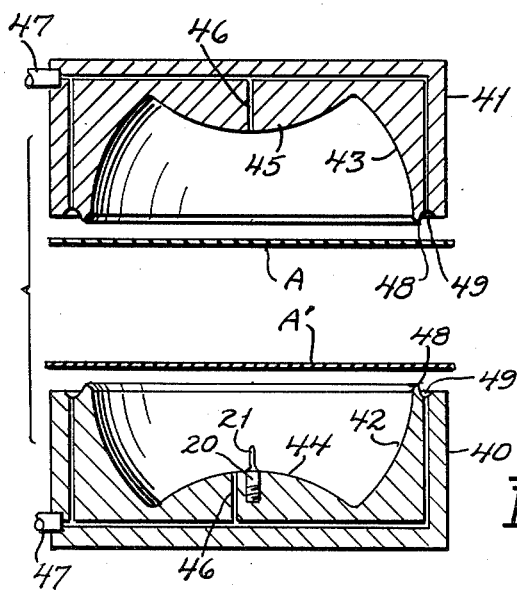
Figure 17:
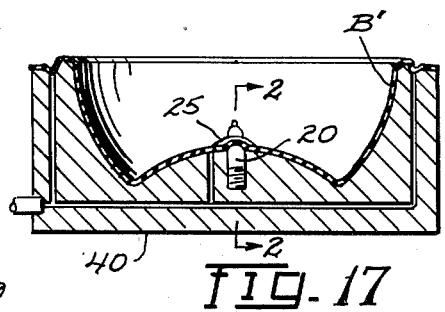
Figure 16:
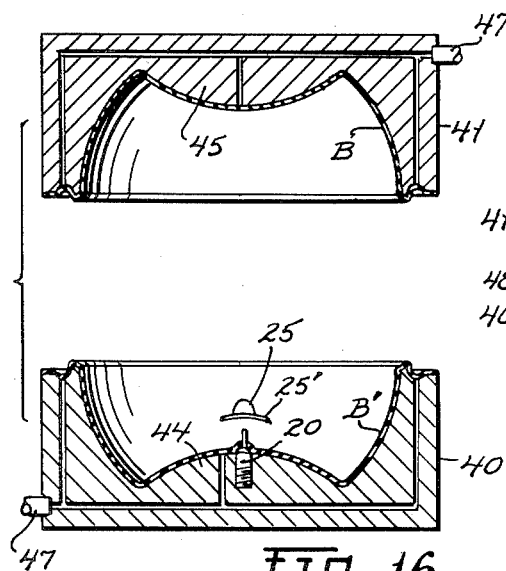
Figure 18:
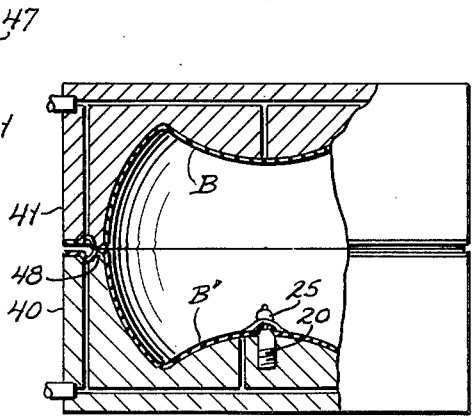
Figure 19:
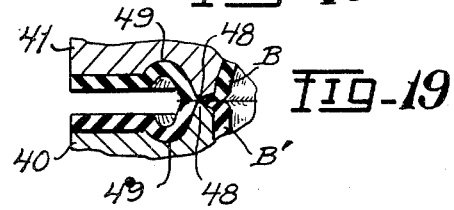

In the drawings, Fig. 1 is a view of a spherical bladder ready for vulcanization, showing a projecting inflating device carried thereby; Fig. 2 is an enlarged view of the inflating device seated in a mold member which bulges the rubber sheet inwardly, this view showing an applied internal boss through which the inflating needle extends; Fig. 3 is an elevation partly broken away of a soft rubber valve member adapted to be inserted in the applied internal boss after vulcanization of the article; Fig. 4 is a perspective of my band provided to encircle the bladder in the region of the meeting faces of the vulcanizing mold; Fig. 5 is a fragmentary view of such band showing the bias direction of the threads; Fig. 6 is a cross enlarged section through the band as indicated by the line 6—6 on Fig. 4 showing the laminated construction thereof; Fig. 7 is a view of a modified form of band made of metal with a concave inner face; Fig. 8 is a view of the ball of Fig. 1 with the band of Fig. 4 applied thereto and the ball inflated ready for vulcanization; Fig. 9 is a view of a vulcanizing mold showing the ball with the positioned band across the meeting faces of the mold; Fig. 10 is a view of my harness adapted for use in the vulcanization of a bladder of several lenticular shaped pieces of calendered rubber, such harness providing a band at the meeting edges of the vulcanizing mold and also bands over the seams of the rubber sections; Fig. 11 is a view of a vulcanizing mold containing an inflated bladder embraced by the harness of Fig. 10; Fig. 12 is a view of a vulcanizing mold and a harness for an ellipsoidal article like a football bladder made of a plurality of sections joined by meridional seams and embraced by my harness; Fig. 13 is a view of an ellipsoidal bladder embraced by my harness and mounted in a vulcanizing mold arranged for the inflating construction at one of the poles of the article; Fig. 14 is a view on a smaller scale of the spherical ball of Fig. 1 embraced by a two-band harness, providing a band over the seam joining the two hemispheres as well as the band at the meeting faces of the mold; Fig. 15 is a vertical section of a two-part forming mold adapted to form the two half sections of a bladder ready for joining, this view showing the mold members separated with two sheets of rubber placed between them; Fig. 16 is a similar view illustrating the condition at the two sheets of rubber after they have been seated in the respective mold members by the application of vacuum to the mold cavities; Fig. 17 is a section of one of the mold members, illustrating the formation of an internal perforated boss suitable for receiving a valve after vulcanization of the article; Fig. 18 is a view of the same two mold members after they have been brought together to join the sections to form a complete hollow body; Fig. 19 is a detail on enlarged scale, showing the equatorial seam with the excess external pinched off as effected by the mold members of Fig. 18.

My vulcanizing method is adapted for use with any hollow rubber ball or bladder irrespective of the way the parts of the article may be joined to make a complete hollow member. In Fig. 1, I have illustrated by way of example a spherical bladder made of two hemispheres of thin rubber A, A' joined by an equatorial seam a, one of which carries an internal inflating valve, which is not shown, though a hypodermic inflating device is indicated at 20. This device may be of the form shown in Fig. 2 and hereinafter described.

After the bladder has been formed it is inflated through the sleeve 20 to bring it up to proper externally convex form of proper size for vulcanization. Before complete inflation is effected, however, I place about the bladder the substantially inelastic endless band of this invention, designated 1, in Fig. 4, this band having an opening 2 adapted to extend over the inflating sleeve 20. This band extends in an equatorial region about the bladder when inflated, as shown in Fig. 8. When the bladder with the band is placed in a vulcanizing mold, as shown in Fig. 9, the band extends across the meeting edges of the mold members 10 and 11, and thus effectively prevents the internal pressure from blowing out the article between the mold members during vulcanization.

My band is capable of withstanding a high degree of heat. The band should curve laterally to contact with the spherical surface. I find that such curvature is readily effected if the band is of fabric having the woven threads thereof extending diagonally, as shown at 3, in Fig. 5, such fabric being rubberized by composition similar to that used in the ordinary air bag for vulcanizing tires. The band preferably comes substantially to a chamfered edge and thus avoids any abrupt indentation in the wall of the ball at such regions. Such chamfered edge may readily be effected by making the band of surmounting layers, as indicated by the successively narrowing layers, 1a, 1b and 1c in Fig. 6. It will be understood that in Fig. 6 the parts are exaggerated to illustrate the construction.

In place of a fabric band 1, I may employ a very thin metallic band transversely concaved, such as indicated in exaggerated form at 4 in Fig. 7, and having chamfered edges 5.

The single band of Fig. 4 is very effective to prevent the blowing out of the sections during vulcanization irrespective of how those sections are made or joined preliminary to mounting in the vulcanizing mold. If the sections are made in two hemispheres, the single band is ordinarily sufficient, but if desired one may employ two bands 1 and 1' at right angles to each other, as shown in Fig. 14, to embrace also the joining seam a of the article.

It is customary in vulcanizing these thin-walled hollow rubber balls to maintain the molds hot, and after vulcanization to relieve the air pressure in the article. The molds are then opened to remove the article and to install a new article, the heating being continuously maintained. Difficulty has been encountered, however, in that the hot mold may seat the cement on the seam in advance of the general vulcanization and thus overcure the seam and weaken it. My harness, comprising for instance the two bands of Fig. 14, not only prevents injury at the meeting faces of the vulcanizing mold but also serves to keep the heat away from the seam, allowing the heat to pass gradually to it during the vulcanization, resulting in a perfect vulcanization at the seam as well as throughout the ball, since by the time the entire surface of rubber has been forced against the mold and has become vulcanized the seam will have received proper vulcanizing heat.

When the article is made of lenticular segments joined by meridional seams, which is the method frequently employed in forming such a bladder, I may use, in place of the single band 1, the harness illustrated in Fig. 10. This harness has the equatorial band to extend across the meeting edges of the vulcanizing mold, such band being here designated 7. The harness also has two other bands 8 and 9 extending in great circles and at right angles to each other and to the band 7. When such a harness is placed on the ball preliminary to vulcanization the band 7 is in position to prevent damage at the meeting edges of the vulcanizing mold while the bands 8 and 9 extend over the lapped or scarfed seams b and c where the lenticular calendered sections are joined in originally forming the bladder.

Fig. 11 illustrates a hollow rubber ball embraced by the harness of Fig. 10 and placed in the vulcanizing mold provided by the members 10 and 11 ready for vulcanization.

If the bladder being formed is ellipsoidal in place of spherical the harness will be correspondingly varied. I illustrate in Fig. 12 an ellipsoidal bladder E embraced by a harness having a band 30 to come at the meeting edges of the mold members 12 and 13. This harness has also two meridional bands 31 and 32 extending over the poles and thus adapted to overlie seams if the article is made of calendered rubber sections. In Fig. 12 I have shown the inflating device 20 as coming at the side of the ellipsoid and the mold members formed each to take a polar half of the article, thus bringing the inflating device at the meeting face with the mold members.

In Fig. 13, I have illustrated an ellipsoidal bladder F embraced by a harness having two bands 35 and 36 at right angles to each other, each extending across the poles of the ellipsoidal body. The inflating device 20 in this case is at one of the poles and the mold members 14 and 15 are formed with comparatively shallow cavities each to receive the longitudinal half of the article.

It will be seen that whatever the shape of the article and whether the single band or the multiple band construction is employed, I provide, in every case, a band about the article located in position to lie across the meeting faces of the two members of the vulcanizing mold, thus effectively preventing the distortion or weakening of the article in this region. Also it will be seen that if desired I may employ additional bands adapted to extend about the article and serving to protect the seam or seams thereof during vulcanization. Such additional bands extend in great circles or ellipses of the article and cross the main band at right angles thereto.

In place of making the harness as a unit as shown in Figs. 10, 12, or 14, I may employ separate bands crossing each other, but this has the disadvantage of thickening the band structure at the crossing and I prefer, where multiple bands are used, to have the entire structure of a uniform thickness, as illustrated in Fig. 10.

An advantage of my harness is that it operates as a gauge for inflating the ball preliminary to placing it in the vulcanizing mold. In vulcanizing such balls it is customary to inflate the article through the air valve approximately to size and insert it in the mold and thereafter to supply additional pressure through the valve, such pressure being maintained during vulcanization. It has been difficult to give the proper size to the ball by the preliminary inflation, and if it is not of the proper size air pockets are likely to form between the ball and the mold surface resulting in an improperly vulcanized wall. My harness provides an excellent gauge. When it is placed about the ball the ball may be inflated until it just begins to bulge between the different straps of the harness and then it will be in proper size for placing in the mold.

With very thin wall balls it is desirable to place a thin strip of rubber outside of the wall directly over the seam preliminary to vulcanization. My harness has the advantage of holding such thin-walled strips definitely in place during vulcanization.

It will be understood from the preceding description that my band to stand across the meeting faces of the vulcanizing mold is independent of the number or shape of the sections of which the bladder is made and independent of the particular way in which the sections of the bladder are joined to each other. When my harness is used, including additional bands to come over the seams, these will vary according to the way in which the bladder is formed from sections.

I have illustrated in Figs. 15 to 19, a very convenient apparatus and method for forming the bladder from two hollow hemispheres, one of which has a valve for inflation, and in such case I prefer to use for vulcanization either the single band of Fig. 4 or a harness having two bands to come at the meeting face of the vulcanizing mold and also over the seam of the sections as illustrated in Figs. 13 and 14.

In Figs. 15 to 19, 40 and 41 indicate two coacting mold members for forming a hollow bladder by the vacuum process. Each of these mold members has a cavity 42 and 43 hemispherical except that adjacent the pole the mold surface is bulged inwardly as at 44 or 45 with a convex curve corresponding to the concave curve of the hemisphere. This form of cavity enables the mold to be of materially less depth and provides a support in the polar region, resulting in a more uniform thickness of wall, the material seated forming a hemisphere by the inward bulge taking an outward position, as soon as the article is released from the mold and inflated.

To seat the sheet rubber material in the mold cavities, I provide passageway 46 leading from each cavity to an external nipple 47 to which a vacuum conduit may be attached. I provide a cutting or pinching ridge 48 at the rim of the cavity. Outside of this I provide an annular groove 49 connected by internal passageways with the same vacuum conduit 47.

Fig. 15 shows at A, A' two sheets of rubber positioned across the respective mold members. When vacuum is applied to these mold members through the conduits attached at 47 the annular edges of the rubber sheets become clamped by vacuum in the grooves 49 and the body of the sheets become seated in the mold cavities, as shown in B, B' in Fig. 16.

As I desire to form the bladder with an inflating valve I provide the lower mold member 40 with a cylindrical cavity in its hump 44 in which is mounted the tubular sleeve 20 having a projecting hypodermic needle 21. When the sheet of rubber is seated in the mold 40, the needle 21 punctures the bladder sheet and extends into the interior thereof, as shown in Fig. 16. Following this seating, I mount on the interior of the section B' a rubber boss 25 having a skirt 25' adapted to engage and be cemented to the interior surface of the bladder section, thus producing the construction shown in Fig. 17 and in enlarged section in Fig. 2.

After the bladder sections have been seated, as shown in Fig. 16, and the valve boss applied, as shown in Fig. 17, such mold parts are brought together, as shown in Fig. 18. The ridges 48 of the two mold members then abut and press the annular extensions of the two rubber sheets to form a seam and pinch off the external rubber, as indicated in large scale in Fig. 19.

It results from the described operation that when the mold members of Fig. 18 are separated and the article removed and compressed air applied through the sleeve 20, the latter being removed with the article, I will have a sphere of rubber, shown in Fig. 1, comprising two sections A and A' joined by an equatorial seam $a$ and carrying an external inflating sleeve 20.

The sleeve 20 and hypodermic needle 21 may be of any approved construction. However, I prefer to use such a device as illustrated in Fig. 2. The sleeve has a bore 22 carrying a spring-seated check valve 23 similar to the usual Schroeder valve on a pneumatic tire. The sleeve 20 is provided with an external thread for the application of a suitable inflating hose. The passageway through the hypodermic needle preferably does not extend to the extreme end thereof but is diverted laterally by openings 24, so that there is no danger of plugging the opening as the point of the needle is forced through the rubber.

The applied boss 25 on the interior of the rubber section is preferably formed with a radial cavity 26 within it, through which the hypodermic needle passes, and with an enlarged annular internal space 27. This space and the cavity 26 are adapted to receive a rubber valve member applied after the vulcanization has been completed. Such valve member is shown at 28 in Fig. 3. It has a passageway through it and an annular external flange 29 intermediately located.

After the article has been vulcanized the needle 21 is withdrawn and the stretching of the exterior portion of the cavity 26 allows the insertion of the soft rubber valve plug 28, its annular collar coming into the annular space 27. The inner edges of the valve plug normally make a tight connection with each other but nevertheless allow the insertion of a hypodermic needle through it for inflating purposes. Accordingly, after inflation when the needle is withdrawn, the rubber lips automatically close into contact with each other, sealing the opening.

When the ball sections are formed with a vacuum method there is a tendency of the rubber sheet, as it is seated in the cavity, to become thinner at the poles, but with my harness this does no harm as the harness, even if of only one band, extends over the regions which are polar in the formation and gives an effective support therefor.

When the hemispherical section formation is produced by such an apparatus as is shown in Figs. 15 to 19, the inflating device is at 90° from the equatorial seam joining the two sections. Accordingly, when the band 1 is put on the formed bladder in the position where it will reach across the vulcanizing mold faces, it comes at right angles to the seam a, Fig. 8, joining the sections A and A'. There is little danger of the separation of the article at this joining seam because it comes in perfectly solid portions of the vulcanizing mold. However, if desired, the second band, illustrated in Fig. 14, may be employed at right angles to the band 1 to cover this seam and protect it before vulcanization.

Air pockets sometimes form between the wall of the ball and the vulcanizing mold in the ordinary process. With my harness holding the ball it is possible to provide the vulcanizing molds with openings for air exhaustion, similar to that shown herein with reference to the forming molds. The harness overlies such openings, as it does the mold joint, and prevents the extrusion of the ball material. Thus, the air may be exhausted from between the entire external surface of the ball and the mold, preventing air pockets.

A method now sometimes used in vulcanizing thin-walled balls, known as the tunnel method, comprises forming the ball, inflating it, then placing it in an individual shell mold and forcing the molds one after another through a heated tunnel for the necessary length of time. My harness is well adapted for balls to be cured by that method, as it is necessary to fully inflate the ball in the mold before it goes into the tunnel, there being no air connection to supply pressure during vulcanization. By using this harness the ball can be accurately inflated before being placed in the mold, then accurately positioned in the mold so that the harness tightly fits the mold and then after the mold is closed the slight additional pressure required to inflate or distend the unsupported section of the wall of the ball against the mold is supplied through the valve and the valve closed. The ball then goes into the tunnel to be cured and cooled; the air exhausted; the ball removed still in the harness and then the harness removed, and another ball inserted into the harness and the operation repeated.

I claim:

1. The method of vulcanizing a hollow rubber ball or bladder having a valve comprising placing about such rubber article a removable band having a hole through it in a position to register with the valve, mounting an inflating device extending through the opening in the band into the rubber article, and placing the article with the inflating device and band in a two part vulcanizing mold with the inflating device at the meeting faces of the mold and the band extending across such faces, supplying air pressure through the inflating device and valve, and heating the mold to effect vulcanization.

2. The method of making a hollow rubber ball or bladder consisting in joining sections of the bladder to make a complete enclosure and providing it with a valve, inflating the article through the valve, placing about the article an endless band having its inner surface of a character which will not adhere to the article during vulcanization, placing the article in the vulcanizing mold with the band extending across the meeting faces of the mold, inflating the article through the valve and heating the mold.

3. In a method of vulcanizing joined hollow rubber articles in a separable vulcanizing mold, the step of placing between the article and the mold, a removable endless band having its inner surface of a character which will not adhere to the article during vulcanization to bridge across the meeting face of the mold and encircle the article along the seam.

4. The method of making and vulcanizing a hollow rubber bladder comprising joining sections of the bladder to make an enclosing article, placing about the article a removable equatorial band having its inner surface of a character which will not adhere to the article during vulcanization out of registration with the seam and a meridional band overlying a seam of the article, placing the bladder with such bands in a vulcanizing mold with said equatorial band bridging across the meeting faces of the mold.

5. The method of making and vulcanizing a hollow rubber ball consisting in building up the ball out of two hemispheres joined by an equatorial seam, placing about the ball a removable equatorial band and a meridional band, placing the ball and harness in a vulcanizing mold, the harness being in such position that the equatorial band bridges across the meeting faces of the mold and the meridional band overlies the seam of the ball, and removing the harness after vulcanization.

6. The method of making and vulcanizing a hollow rubber article consisting in building up the article out of rubber sheets joined by meridional seams, placing about the article a removable equatorial band and a plurality of removable meridional bands, placing the article and harness in a vulcanizing mold in such position that the equatorial band bridges across the meeting faces of the mold and the meridional bands overlie the seam of the article, and removing the harness after vulcanization.

7. The method of vulcanizing a hollow rubber article comprising placing a harness about the article at its equator and extending across its poles, inflating the article while using the harness as a gauge to determine the inflation, mounting the inflated article with its harness in a separable vulcanizing mold with said equatorial band bridging across the meeting faces of the mold, removing the article with its harness from the mold following vulcanization, and thereafter removing the harness from the article.

8. In an apparatus for vulcanizing hollow rubber articles, a harness having a band adapted to extend around an equatorial region of the article and having one or more other bands adapted to pass over polar regions of the article, said bands having their inner surfaces of a character which will not adhere to the article during vulcanization.

9. The combination with a separable vulcanizing mold having a spherical or spheroidal cavity of a band adapted to be placed about an article to occupy the mold in position to bridge across the meeting faces of the mold, said band being composed of surmounting layers of successively narrower material.

10. The combination with a separable vulcanizing mold having a spherical or spheroidal cavity of a band adapted to be placed about an article to occupy the mold in position to bridge across the meeting faces of the mold, said band being composed of rubberized fabric with the threads on the bias to enable it to conform transversely to the curvature of the mold.

11. The combination with a separable vulcanizing mold having a spherical or spheroidal cavity of a band adapted to be placed about an article to occupy the mold in position to bridge across the meeting faces of the mold, said band being made of metal with a concave inner face.

12. A harness for use in vulcanizing a spherical or ellipsoidal article comprising an endless band adapted to extend about the article in position to bridge across the meeting faces of a separable vulcanizing mold and another band arranged in a great circle about the article at a right angle to the first-mentioned band, said bands having their inner surfaces of a character which will not adhere to the article during vulcanization.

13. A harness for use in vulcanizing a spherical or ellipsoidal article comprising a band adapted to extend about the article in position to bridge across the meeting faces of a separable vulcanizing mold and a plurality of other bands arranged in great circles about the article at an angle to the first-mentioned band, said bands having their inner surfaces of a character which will not adhere to the article during vulcanization.

14. The method of vulcanizing in a separable vulcanizing mold a hollow rubber article having parts joined by a seam comprising placing a removable endless flexible band having its inner surface of a character which will not adhere to the article during vulcanization about the article in position continuously overlying the seam, inflating the article and placing the article with its band in the vulcanizing mold.

15. The method of vulcanizing a hollow rubber article having parts joined by a seam and having a valve, comprising inflating the article through the valve, placing a removable endless band having its inner surface of a character which will not adhere to the article during vulcanization about the article in position continuously overlying the seam, and placing the article with its band in a two part vulcanizing mold.

FRED THOMAS ROBERTS.

REFERENCES CITED

The following references are of record in the file of this patent:

UNITED STATES PATENTS

| Number | Name | Date |
|---|---|---|
| 634,302 | Longden | Oct. 3, 1899 |
| 1,007,434 | Destribats | Oct. 31, 1911 |
| 1,629,582 | McClintock | May 24, 1927 |
| 2,242,795 | Soderquist | May 20, 1941 |
| 2,380,370 | Smith, Jr. | July 10, 1945 |

FOREIGN PATENTS

| Number | Country | Date |
|---|---|---|
| 26,573 | Austria | May 8, 1930 |
| 186,893 | Great Britain | Mar. 1, 1923 |
| 216,072 | Great Britain | May 9, 1924 |